US012711394B2

(12) United States Patent
Peng et al.

(10) Patent No.: US 12,711,394 B2
(45) Date of Patent: Aug. 18, 2026

(54) FEDERATED LEARNING

(71) Applicant: BEIJING BAIDU NETCOM SCIENCE TECHNOLOGY CO., LTD., Beijing (CN)

(72) Inventors: Shengbo Peng, Beijing (CN); Jiwen Zhou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 770 days.

(21) Appl. No.: 18/180,594

(22) Filed: Mar. 8, 2023

(65) Prior Publication Data

US 2023/0222356 A1 Jul. 13, 2023

(30) Foreign Application Priority Data

Mar. 10, 2022 (CN) ........................ 202210234461.X

(51) Int. Cl.
*G06N 3/098* (2023.01)

(52) U.S. Cl.
CPC .................................... *G06N 3/098* (2023.01)

(58) Field of Classification Search
CPC ...... G06N 3/098; G06N 20/00; G06F 9/5016; G06F 2209/5017; G06F 9/5027; G06F 9/5066; G06F 9/5044; G06F 2209/504; Y02D 10/00
See application file for complete search history.

(56) References Cited

U.S. PATENT DOCUMENTS

2019/0258964 A1* 8/2019 Dube ...................... G06F 16/22
2021/0304062 A1* 9/2021 Rajamoni ............. G06N 20/00
2021/0406088 A1* 12/2021 Chen ...................... G06F 9/547
2022/0083916 A1* 3/2022 Khan ..................... G06N 20/00
(Continued)

FOREIGN PATENT DOCUMENTS

CN 102404385 A 4/2012
CN 109062700 A 12/2018
(Continued)

OTHER PUBLICATIONS

Ro et al. ("Scaling Language Model Size in Cross-Device Federated Learning", (FL4NLP 2022), pp. 6-20) (Year: 2022).*
(Continued)

*Primary Examiner* — Imad Kassim
(74) *Attorney, Agent, or Firm* — Seed IP Law Group LLP

(57) ABSTRACT

A federated learning method and apparatus, a device and a medium are provided, and relates to the field of artificial intelligence, in particular to the field of federated learning and machine learning. The federated learning method includes: receiving data related to a federated learning task of a target participant, wherein the target participant at least includes a first computing device for executing the federated learning task; determining computing resources of the first computing device that are able to be used to execute the federated learning task; and generating a first deployment scheme for executing the federated learning task in response to determining that the data and the computing resources meet a predetermined condition, wherein the first deployment scheme instructs to generate at least a first work node and a second work node on the first computing device.

16 Claims, 6 Drawing Sheets

(56) References Cited

U.S. PATENT DOCUMENTS

| | | | | |
|---|---|---|---|---|
| 2022/0350898 | A1* | 11/2022 | Lv | H04L 9/16 |
| 2022/0374762 | A1* | 11/2022 | Radhakrishnan | G06N 3/08 |
| 2023/0012487 | A1* | 1/2023 | Makaya | G06F 9/5027 |
| 2023/0050708 | A1* | 2/2023 | Watanabe | G06N 3/08 |
| 2023/0088897 | A1* | 3/2023 | Wang | G06N 20/00 706/12 |
| 2024/0005341 | A1* | 1/2024 | Ouyang | G06N 20/00 |

FOREIGN PATENT DOCUMENTS

| | | | |
|---|---|---|---|
| CN | 109213600 | A | 1/2019 |
| CN | 112148437 | A | 12/2020 |
| CN | 113342274 | A | 9/2021 |
| CN | 113516250 | A | 10/2021 |
| CN | 113778646 | A | 12/2021 |
| JP | 2021144401 | A | 9/2021 |
| WO | 2021/126272 | A1 | 6/2021 |
| WO | WO 2021191750 | A1 | 9/2021 |

OTHER PUBLICATIONS

Yu et al. (“Toward Resource-Efficient Federated Learning in Mobile Edge Computing”, 2021 IEEE) (Year: 2021).*

Ma et al. (“adaptive Batch Size for Federated Learning in Resource-Constrained Edge Computing”, , vol. 22, No. 1, Jan. 2021) (Year: 2021).*

Horizontal Federated Learning with English Abstract, CSDN, Apr. 10, 2020, 18 pages https://blog.csdn.net/liudongdong19/article/details/105070141/.

Subramanian et al., Specification for U.S. Pat. No. 11,175,953, “Determining an Allocation of Computer Resources for a Job,” Accenture Global Solutions Limited, Nov. 16, 2021, 83 pages.

Wang et al., “Brief Introduction of Federated Learning,” Shanxi Vocational College of finance, China University of Science and Technology, 2020, 6 pages.

Zhan et al., “Experience-Driven Computational Resource Allocation of Federated Learning by Deep Reinforcement Learning,” 2020 IEEE International Parallel and Distributed Processing Symposium (IPDPS), May 1, 2020, 10 pages.

* cited by examiner

FEDERATED LEARNING

CROSS-REFERENCE TO RELATED APPLICATION

This application claims priority to Chinese Patent Application No. 202210234461.X, filed on Mar. 10, 2022, the contents of which are hereby incorporated by reference in their entirety for all purposes.

BACKGROUND

Artificial intelligence is a subject for studying to enable a computer to simulate a certain thought process and intelligent behavior (such as learning, reasoning, thinking and planning) of people, and has both a technology in a hardware level and a technology in a software level. An artificial intelligence hardware technology generally includes technologies such as a sensor, a dedicated artificial intelligence chip, cloud computing, distributed storage and big data processing. An artificial intelligence software technology mainly includes several major directions of a computer vision technology, a speech recognition technology, a natural language processing technology, machine learning/deep learning, a big data processing technology, a knowledge mapping technology, etc.

Federated learning is an emerging artificial intelligence basic technology. Its original design goal is to carry out machine learning or deep learning among multiple participants or multiple computing nodes on the premise of ensuring information security during big data exchange, protecting privacy of terminal data and personal data, and ensuring legal compliance. At present, federated learning has become one of current research hotspots in the field of data science. However, a federated learning algorithm generally ensures data security through cryptography, which greatly reduces efficiency of the algorithm.

A technique described in this part is not necessarily a technique that has been conceived or employed previously. Unless otherwise specified, it should not be assumed that any technique described in this part is regarded as the prior art only because it is included in this part. Similarly, unless otherwise specified, a problem mentioned in this part should not be regarded as being publicly known in any prior art.

TECHNICAL FIELD

The present disclosure relates to the technical field of artificial intelligence, and specifically relates to the technical field of machine learning and federated learning, in particular to a federated learning method and apparatus, an electronic device, a computer readable storage medium and a computer program product.

BRIEF SUMMARY

The present disclosure provides a federated learning method and apparatus, an electronic device, a computer readable storage medium and a computer program product.

According to an aspect of the present disclosure, a federated learning method is provided, including: receiving data related to a federated learning task of a target participant, wherein the target participant at least includes a first computing device for executing the federated learning task; determining computing resources of the first computing device that are available to be used to execute the federated learning task; and generating a first deployment scheme for executing the federated learning task in response to determining that the data and the computing resources meet a predetermined condition, wherein the first deployment scheme indicates to generate at least a first work node and a second work node on the first computing device.

According to an aspect of the present disclosure, a federated learning apparatus is provided, including: a receiving unit, configured to receive data related to a federated learning task of a target participant, wherein the target participant at least includes a first computing device for executing the federated learning task; a determining unit, configured to determine computing resources of the first computing device that are available to be used to execute the federated learning task; and a first generating unit, configured to generate a first deployment scheme for executing the federated learning task in response to determining that the data and the computing resources meet a predetermined condition, wherein the first deployment scheme indicates to generate at least a first work node and a second work node on the first computing device.

According to an aspect of the present disclosure, an electronic device is provided, including: one or more processors; a memory storing one or more programs configured to be executed by the one or more processors, the one or more programs including instructions for: receiving data related to a federated learning task of a target participant, wherein the target participant at least comprises a first computing device for executing the federated learning task; determining computing resources of the first computing device that are available to be used to execute the federated learning task; and generating a first deployment scheme for executing the federated learning task in response to determining that the data and the computing resources meet a predetermined condition, wherein the first deployment scheme indicates to generate at least a first work node and a second work node on the first computing device.

According to an aspect of the present disclosure, a non-transitory computer-readable storage medium is provided, and stores one or more programs, the one or more programs including instructions, which when executed by one or more processors of an electronic device, cause the electronic device to: receive data related to a federated learning task of a target participant, wherein the target participant at least comprises a first computing device for executing the federated learning task; determine computing resources of the first computing device that are available to be used to execute the federated learning task; and generate a first deployment scheme for executing the federated learning task in response to determining that the data and the computing resources meet a predetermined condition, wherein the first deployment scheme indicates to generate at least a first work node and a second work node on the first computing device.

According to an aspect of the present disclosure, a computer program product is provided, including a computer program, wherein the computer program, when executed by a processor, implements the above method.

According to one or more embodiments of the present disclosure, by generating a deployment scheme for running the plurality of work nodes on the same computing device under the situation that the data of the target participant and the computing resources of the computing device of the target participant meet the predetermined condition, a problem of low utilization of the computing resources due to the fact that the computing device cannot allocate all or most of the computing resources on the computing device to the single computing node is solved, so that the computing resources of the single computing device can be efficiently and fully utilized to perform joint modeling on a large amount of data horizontally or vertically, and efficiency of federated learning is improved.

It should be understood that the content described in this part is not intended to identify key or important features of the embodiments of the present disclosure, and is not used to limit the scope of the present disclosure as well. Other features of the present disclosure will become easily understood through the following specification.

BRIEF DESCRIPTION OF THE SEVERAL VIEWS OF THE DRAWINGS

Accompanying drawings exemplarily show the embodiments, constitute a part of the specification, and together with text description of the specification, serve to explain example implementations of the embodiments. The shown embodiments are only for the purpose of illustration, and do not limit the scope of the claim. In all the accompanying drawings, the same reference numerals refer to the similar but not necessarily the same elements.

DETAILED DESCRIPTION

Figure 1:
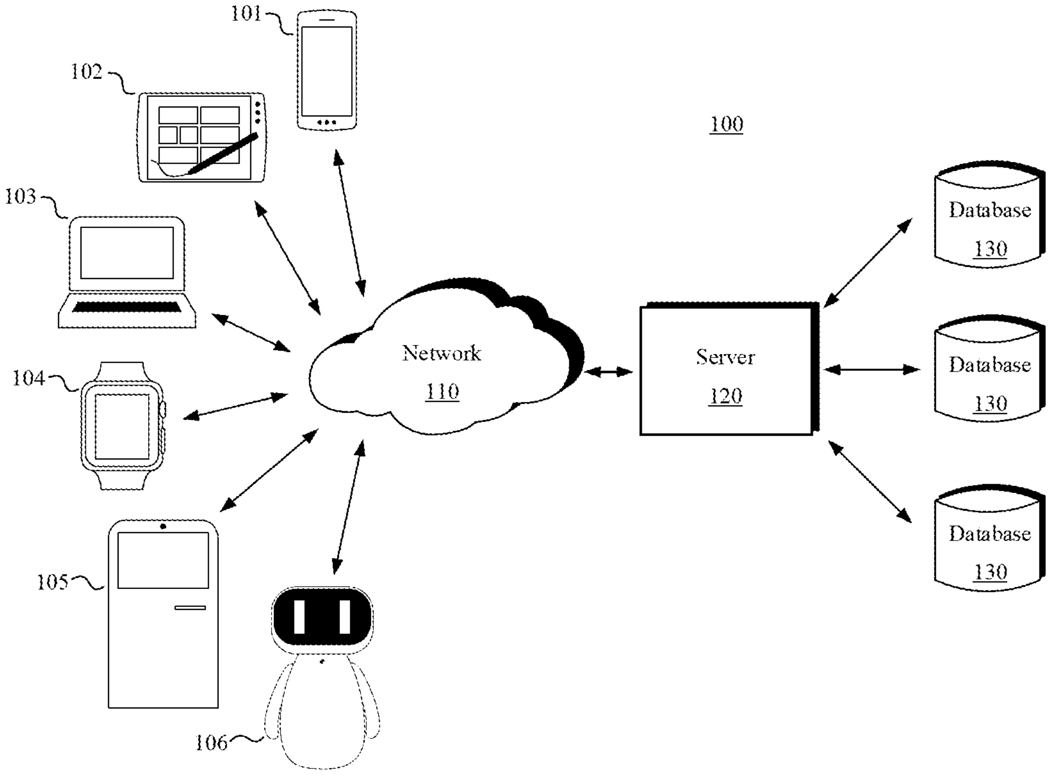
FIG. 1 shows a schematic diagram of an example system in which various methods described herein may be implemented according to an embodiment of the present disclosure.

The example embodiment of the present disclosure is illustrated below with reference to the accompanying drawings, including various details of the embodiment of the present disclosure for aiding understanding, and they should be regarded as being only examples. Therefore, those ordinarily skilled in the art should realize that various changes and modifications may be made on the embodiments described here without departing from the scope of the present disclosure. Similarly, for clarity and simplicity, the following description omits description of a publicly known function and structure.

In the present disclosure, unless otherwise noted, describing of various elements by using terms “first”, “second” and the like does not intend to limit a position relationship, a time sequence relationship or an importance relationship of these elements, and this kind of terms is only used to distinguish one component with another component. In some examples, a first element and a second element may refer to the same instance of this element, while in certain cases, they may also refer to different instances based on the contextual description.

The terms used in description of various examples in the present disclosure are only for the purpose of describing the specific examples, and are not intended to limit. Unless otherwise explicitly indicated in the context, if the quantity of the elements is not limited specially, there may be one or more elements. In addition, the term “and/or” used in the present disclosure covers any one of all possible combination modes in the listed items.

In the related art, federated learning tasks run on a single node, which cannot handle a business scenario with massive data. Part of federated learning frameworks run on a plurality of computing nodes with the help of distributed ideas, but part of federated learning algorithms does not support parallel computing in principle, so they cannot be well applied in these federated learning frameworks, resulting in insignificant improvements in algorithm efficiency or incapability of handling large datasets.

In order to solve the above problem, according to the present disclosure, by generating a deployment scheme for running a plurality of work nodes on the same computing device under a situation that data of a target participant and computing resources of a computing device of the target participant meet a predetermined condition, a problem of low utilization of the computing resources due to the fact that the computing device cannot allocate all or most of the computing resources on the computing device to the single computing node is solved, so that the computing resources of the single computing device can be efficiently and fully utilized to perform joint modeling on a large amount of data horizontally or vertically, and efficiency of federated learning is improved.

The embodiment of the present disclosure will be described below in detail with reference to the accompanying drawings.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120, and one or more communication networks 110 for coupling the one or more client devices to the server 120. The client devices 101, 102, 103, 104, 105 and 106 may be configured to execute one or more application programs.

In the embodiment of the present disclosure, the server 120 may run to be capable of executing one or more services or software applications of a federated learning method.

In certain embodiments, the server 120 may further provide other services or software applications which may include a non-virtual environment and a virtual environment. In certain embodiments, these services may be provided as a web-based service or cloud service, for example, be provided to users of the client devices 101, 102, 103, 104, 105 and/or 106 under a software as a service (SaaS) network.

In configuration shown in FIG. 1, the server 120 may include one or more components for implementing functions executed by the server 120. These components may include a software component, a hardware component or their combinations capable of being executed by one or more processors. The users operating the client devices 101, 102, 103, 104, 105 and/or 106 may sequentially utilize one or more client application programs to interact with the server 120, so as to utilize the service provided by these components. It should be understood that various different system configurations are possible, which may be different from the system 100. Therefore, FIG. 1 is an example of a system for implementing various methods described herein, and is not intended to limit.

The users may use the client devices 101, 102, 103, 104, 105 and/or 106 for information processing. The client devices may provide an interface that enables the users of the client devices to interact with the client devices. For example, the users may use a client to input instructions related to the federated learning task to the server through various input devices. The client devices may further output information to the users via the interface. For example, the client can output an execution result of the federated learning task and a result of using a trained federated learning model to predict a sample to the users. Although FIG. 1 describes the six client devices, those skilled in the art should understand that the present disclosure may support any quantity of client devices.

The client devices 101, 102, 103, 104, 105 and/or 106 may include various types of computer devices, such as a portable handheld device, a general-purpose computer (such as a personal computer and a laptop computer), a workstation computer, a wearable device, an intelligent screen device, a self-service terminal device, a service robot, a game system, a thin client, various message transceiving devices, a sensor or other sensing devices, etc. These computer devices may run various types and versions of software application programs and operating systems, such as MICROSOFT Windows, APPLE iOS, a UNIX-like operating system, Linux or Linux-like operating system (such as GOOGLE Chrome OS); or include various mobile operating systems, such as MICROSOFT Windows Mobile OS, iOS, Windows Phone, and Android. The portable handheld device may include a cellular phone, an intelligent telephone, a tablet computer, a personal digital assistant (PDA), etc. The wearable device may include a head-mounted display (such as smart glasses) and other devices. The game system may include various handheld game devices, a game device supporting Internet, etc. The client devices can execute various different application programs, such as various Internet-related application programs, a communication application program (such as an electronic mail application program), and a short message service (SMS) application program, and may use various communication protocols.

A network 110 may be any type of network well known by those skilled in the art, and it may use any one of various available protocols (including but not limited to TCP/IP, SNA, IPX, etc.) to support data communication. As an example only, the one or more networks 110 may be a local area network (LAN), an Ethernet-based network, a Token-Ring, a wide area network (WAN), an Internet, a virtual network, a virtual private network (VPN), an intranet, an extranet, a public switched telephone network (PSTN), an Infrared network, a wireless network (such as Bluetooth and WIFI), and/or any combination of these and/or other networks.

The server 120 may include one or more general-purpose computers, dedicated server computers (such as personal computer (PC) servers, UNIX servers, and midrange servers), blade servers, mainframe computers, server clusters or any other proper arrangements and/or combinations. The server 120 may include one or more virtual machines running a virtual operating system, or other computing architectures involving virtualization (such as one or more flexible pools of a logic storage device capable of being virtualized so as to maintain a virtual storage device of the server). In various embodiments, the server 120 may run one or more services or software applications providing the functions described hereunder.

A computing unit in the server 120 may run one or more operating systems including any above operating system and any commercially available server operating system. The server 120 may further run any one of various additional server application programs and/or a middle tier application program, including an HTTP server, an FTP server, a CGI server, a JAVA server, a database server, etc.

In some implementations, the server 120 may include one or more application programs, so as to analyze and merge data feed and/or event update received from the users of the client devices 101, 102, 103, 104, 105 and 106. The server 120 may further include one or more application programs, so as to display the data feed and/or a real-time event via one or more display devices of the client devices 101, 102, 103, 104, 105 and 106.

In some implementations, the server 120 may be a server of a distributed system, or a server in combination with a blockchain. The server 120 may also be a cloud server, or an intelligent cloud computing server or an intelligent cloud host with an artificial intelligence technology. The cloud server is a hosting product in a cloud computing service system, so as to solve the defects of large management difficulty and weak business scalability in service of a traditional physical host and a virtual private server (VPS).

The system 100 may further include one or more databases 130. In certain embodiments, these databases may be used to store data and other information. For example, one or more of the databases 130 may be used to store information such as an audio file and a video file. A data 130 may be resident at various positions. For example, the data repository used by the server 120 may be locally at a server 120, or may be away from the server 120, and may be in communication with the server 120 via network-based or dedicated connection. The data 130 may be of different types. In certain embodiments, the data repository used by the server 120 may be a database, such as a relational database. One or more of these databases may store, update and retrieve data to the database and from the database in response to a command.

In certain embodiments, one or more of the databases 130 may further be used by the application program to store application program data. The database used by the application program may be different types of databases, such as a key value memory pool, an object memory pool, or a conventional memory pool supported by a file system.

The system 100 in FIG. 1 may be configured and operated in various modes, so as to be capable of applying various methods and apparatuses described according to the present disclosure.

Figure 2:
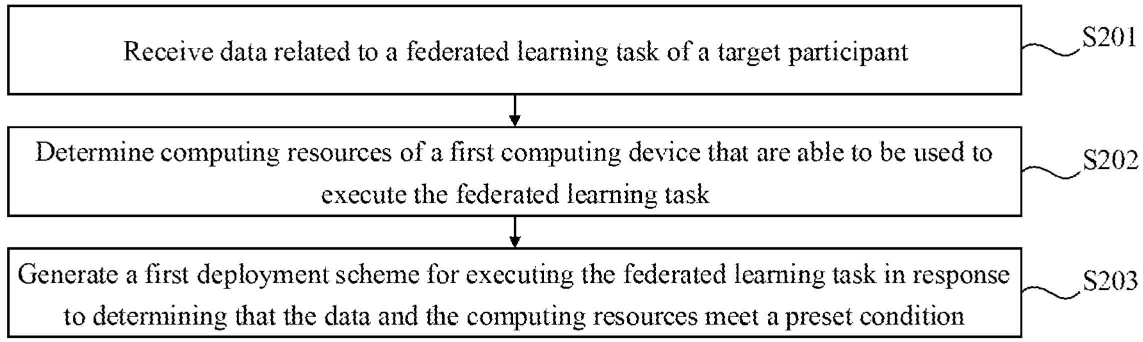
FIG. 2 shows a flow diagram of a federated learning method according to an example embodiment of the present disclosure.

According to one aspect of the present disclosure, a federated learning method is provided. As shown in FIG. 2, the method includes: step S201, data related to a federated learning task of a target participant are received, wherein the target participant at least includes a first computing device for executing the federated learning task; step S202, computing resources of the first computing device that are able to be used to execute the federated learning task is determined; and step S203, a first deployment scheme for executing the federated learning task is generated in response to determining that the data and the computing resources meet a threshold, referred to herein as a predetermined condition for descriptive purposes, wherein the first deployment scheme instructs to generate at least a first work node and a second work node on the first computing device.

Thus, by generating a deployment scheme for running a plurality of work nodes on the same computing device under a situation that data of the target participant and computing resources of a computing device of the target participant meet a predetermined condition, a problem of low utilization of the computing resources due to the fact that the computing device cannot allocate all or most of the computing resources on the computing device to the single computing node is solved, so that the computing resources of the single computing device can be efficiently and fully utilized to perform joint modeling on a large amount of data horizontally or vertically, and efficiency of federated learning is improved.

In some embodiments, the method of the present disclosure may be applied to the participant of federated learning, including any participant in horizontal federated learning and a participant with feature data in vertical federated learning.

In some embodiments, step S201, receiving the data related to the federated learning task of the target participant may include: data respectively owned by the plurality of participants executing the federated learning task are aligned, so as to obtain data actually used by each participant for joint training.

In a business scenario of actually participating in joint modeling, data formats and data types of the participants are various, so a federated learning platform needs to support these multi-source data, shield underlying data difference, and be transparent to an upper-level modeling process. In some embodiments, source data in types such as a data table, a database, a Hadoop distributed file system (HDFS), cloud storage, and online input may be accessed to the federated learning platform through file upload and table creation statements, and these data sources may generate a generic data interface DataFrame through an SQL engine. DataFrame is a common Java object that does not store an original data file, but records a data transformation process, and supports a variety of transform and action operators. The transformation of the DataFrame is completed through the transform operator, and the transform operator will only be executed when the action operator is triggered, which belongs to a delayed execution mechanism. In this way, a storage space occupied by the data can be reduced, and utilization of a storage resource can be improved. In addition, DataFrame may further support streaming and per-column reading of the data. It may be understood that when receiving the data, the data may not be read first and data-related information (for example, the number of rows and columns) is not obtained first, then the data may be partitioned according to the data information, and when the data needs to be processed by using the work node, the corresponding part of the data is read by the work node.

In some embodiments, the target participant may include the plurality of computing devices, and then it may be determined whether to generate a deployment scheme for deploying the plurality of work nodes on this node for the computing device according to the data allocated to each computing device and the computing resources of the computing device that are able to be used to execute the federated learning task.

In some embodiments, computing resources of a first computing device for the federated learning task may include at least one of a processor resource, a memory resource, or a bandwidth resource.

According to some embodiments, the predetermined condition may indicate that a size of a maximum computing resource allocated by the first computing device for a single work node in the computing resources is smaller than a size of the data. That is to say, when it is determined that the size of the maximum computing resource that the first computing device can allocate to the single work node in the computing resources is smaller than the size of data volume used for performing the federated learning task, a deployment scheme of the two work node are at least generated on the first computing device, so that the utilization of the computing resources of the first computing device can be improved. When there is only one computing node on the single computing device and the data volume used for the federated learning task is large, the computing device cannot allocate enough computing resources to the computing node. In an example embodiment, the data used for the federated learning task needs to occupy 200 GB of memory resource, but the computing device cannot allocate such memory resources to the single computing node. By generating ten work nodes, the computing device may allocate 20 GB of memory resources to each work node, thereby realizing full utilization of the computing resources of the computing device. In addition, setting the plurality of work nodes on one computing device can further avoid communication overhead caused by setting the plurality of work nodes on the plurality of computing devices. It may be understood that the predetermined condition may further be set in other ways, for example, a ratio of the size of the data to the size of the computing resources is greater than a predetermined threshold, which is not limited here.

In some embodiments, the quantity of the work nodes run concurrently may be referred to as a degree of parallelism.

According to some embodiments, the first work node and the second work node are two processes running on the first computing device, so that the federated learning task for the target participant can be executed in parallel on the same computing device. In these work nodes, a plurality of threads may further be included to further improve a processing efficiency of the federated learning task.

Figure 3:
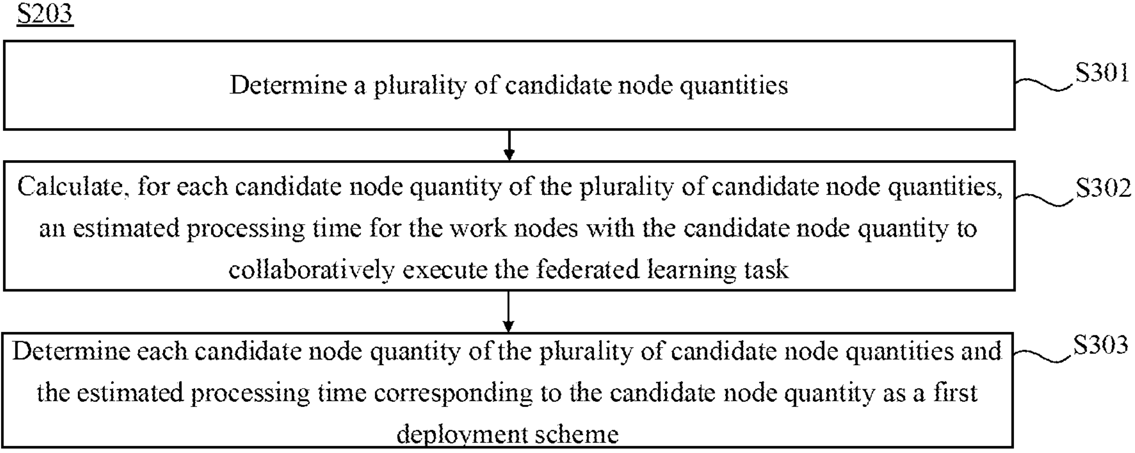
FIG. 3 shows a flow diagram of generating a first deployment scheme according to an example embodiment of the present disclosure.

According to some embodiments, as shown in FIG. 3, step S203, generating the first deployment scheme for executing the federated learning task in response to determining that the data and the computing resources meet the predetermined condition includes: step S301, a plurality of candidate node quantities are determined, wherein each candidate node quantity of the plurality of candidate node quantities instructs to generate work nodes with the candidate node quantity on the first computing device; step S302, for each candidate node quantity of the plurality of candidate node quantities, an estimated processing time for the work nodes with the candidate node quantity to collaboratively execute the federated learning task is calculated, wherein each work node of the work nodes with the candidate node quantity is able to execute the federated learning task by using a part of the computing resources based on a part of the data; and step S303, each candidate node quantity of the plurality of candidate node quantities and the estimated processing time corresponding to the candidate node quantity are determined as the first deployment scheme.

Therefore, by determining the plurality of candidate node quantities, and determining the estimated processing time of the work nodes of these candidate node quantities to execute the federated learning task under configuration of a current computing resource, data volume, and the selected federated learning algorithm, a plurality of work node deployment schemes and the estimated processing time corresponding to each deployment scheme can be obtained, and then the most suitable scheme can be determined among these schemes by the first computing device or by a user of the target participant and applied to execute the federated learning task, thus realizing efficient utilizing of the computing resources and improving a processing speed of the federated learning task.

In some embodiments, it may be assumed that the computing resources and the data are equally distributed to each work node of the work nodes with the candidate node quantity to obtain the estimated processing time in the optimal case. Since the computing resources used by these work nodes and processed data, parameters, and models may be independent, parallel running may be realized, thereby realizing the collaborative execution of the federated learning task.

According to some embodiments, when calculating the memory resource usage corresponding to all the candidate node quantities, a memory expansion rate of the used federated learning algorithm needs to be considered. The memory expansion rate refers to a size of a memory occupied by a model of the federated learning algorithm and a size of a space required to store the model of the federated learning algorithm when the federated learning task is executed. In some embodiments, the memory expansion rate may be related to the federated learning algorithm and the data volume of the corresponding model. Therefore, it is necessary to calculate the corresponding memory expansion rate according to the selected federated learning algorithm and the data volume of the corresponding model, and calculate the size of the memory resources required by each node with the candidate node quantity according to the memory expansion rate, and then the size of the memory resources required to execute the federated learning task corresponding to the candidate node quantity is obtained. In this way, whether the computing resources used by the target participant for federated learning support these candidate node quantities may be judged.

In some embodiments, the user may only wish to use part of the computing resources of the target participant to execute the federated learning task, and thus the size and parallelism of the computing resources for executing the federated learning task may be determined according to the plurality of pre-stored estimated processing times corresponding to the sizes of the plurality of computing resources, the plurality of federated learning algorithms, and combination of the plurality of parallelisms (i.e., the quantity of the work nodes run concurrently). Therefore, by pre-storing the estimated processing time under the plurality of different deployment schemes and sending these estimated processing times to the corresponding user, it is possible to help the user to select the sizes and parallelism of the computing resources expected to execute the federated learning task, thereby providing a more flexible way to fully utilize the computing resources of the target participant.

In some embodiments, when the computing resources of the single computing device are insufficient to process the federated learning task, the plurality of work nodes may also be distributed on the plurality of computing devices, but the plurality of work nodes may further be run on part of the computing device in these computing devices by using the method of the present disclosure, to improve the computing resource utilization of the computing device.

Figure 4:
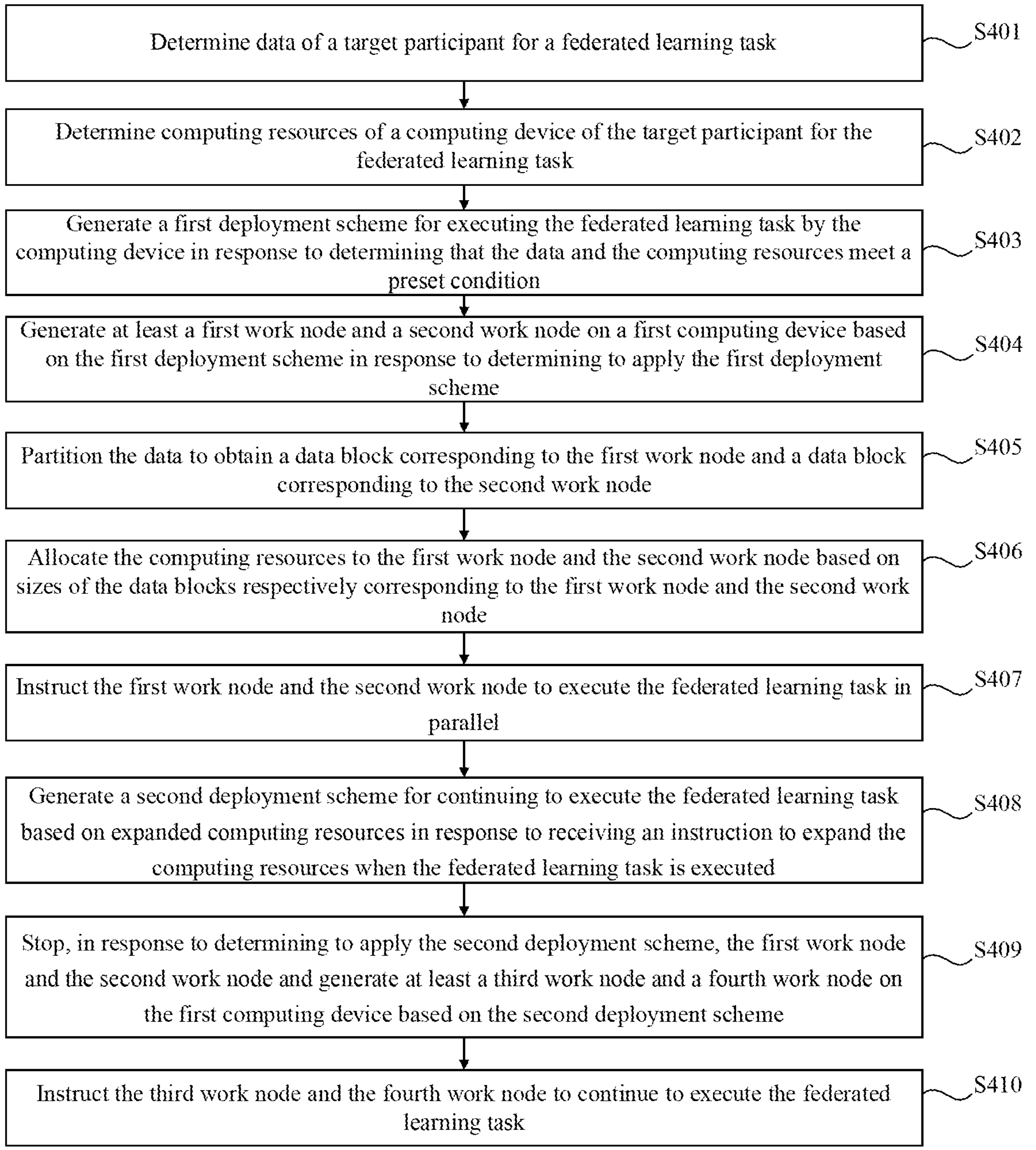
FIG. 4 shows a flow diagram of a federated learning method according to an example embodiment of the present disclosure.

According to some embodiments, as shown in FIG. 4, the federated learning method may further include: step S404, at least the first work node and the second work node are generated on the first computing device based on the first deployment scheme in response to determining to apply the first deployment scheme; step S405, the data are partitioned to obtain a data block corresponding to the first work node and a data block corresponding to the second work node; step S406, the computing resources are allocated to the first work node and the second work node based on sizes of the data blocks respectively corresponding to the first work node and the second work node; and step S407, the first work node and the second work node are instructed to execute the federated learning task in parallel. Operations of step S401-step S403 in FIG. 4 are similar to operations of step S201-step S203 in FIG. 2, which is not repeated here.

Therefore, after applying the first deployment scheme, at least two work nodes may be generated on the first computing device, and the data are partitioned to obtain the data block processed by each work node, then the computing resource is allocated for each work node according to the sizes of the respectively corresponding data blocks, and these work nodes are instructed to utilize the corresponding computing resources to execute the federated learning task, thereby realizing parallel processing of the federated learning task at the target participant and improving the efficiency of executing the federated learning task.

In some embodiments, determining to apply the first deployment scheme may be determined by, for example, a user, or may be determined by the first computing device. In an example embodiment, the first computing device may determine, among the plurality of first deployment schemes, the first deployment scheme with the least estimated processing time, and apply the first deployment scheme.

According to some embodiments, the first deployment scheme may further instruct to generate a parameter node on the first computing device. The generated parameter node may be used for data division, parameter distribution, and local result aggregation, while the generated work node may be used to read the corresponding data and perform parameter calculation and update. Such a node setup mode enables to efficiently execute the federated learning task for the target participant in parallel. In some embodiments, step S405 may be executed by the parameter node. In some embodiments, the parameter node may run on the first computing device together with the first work node and the second work node.

According to some embodiments, the data used by the target participant for the federated learning task may include a plurality of respective feature data of a plurality of samples. When the federated learning task is a vertical federated learning task, step S405, partitioning the data includes: the data are partitioned based on a plurality of features included in the data, so as to obtain a first data block corresponding to the first work node and a second data block corresponding to the second work node, wherein the first data block includes a first part of feature data of the plurality of samples, and the second data block includes a second part of feature data of the plurality of samples.

In some embodiments, in the vertical federated learning task, each participant has a part of feature data or label data of all the samples. Although a vertical federated learning algorithm as a whole does not support parallel computing, the feature data may be divided into the plurality of data blocks by feature (i.e., by column) within each participant with the feature data, and each work node is instructed to process the corresponding data block, and in turn the parameter node is instructed to aggregate processing results (e.g., encryption gradient sum), so as to improve the efficiency of training a model of the federated learning algorithm at the target participant. The specific steps for the parameter node and work nodes to execute the vertical federated learning task will be introduced below.

In some embodiments, the first part of feature data and the second part of feature data are both feature data of a part of features of all the samples in the data, and may not overlap. Therefore, both the first work node and the second work node may process encryption gradient data by utilizing the allocated computing resources and the corresponding data blocks based on the received encryption gradient data, so as to obtain an encryption splitting gain. In turn, the encryption splitting gain may be sent to the corresponding parameter node for gathering and aggregation, as will be described below.

According to some embodiments, when the federated learning task is a horizontal federated learning task, step S405, partitioning the data includes: the data are partitioned based on the plurality of sampled included in the date, so as to obtain a third data block corresponding to the first work node and a fourth data block corresponding to the second work node, wherein the third data block includes a plurality of feature data of a first part of samples of the plurality of samples, and the fourth data block includes a plurality of feature data of a second part of samples of the plurality of samples.

In some embodiments, in the horizontal federated learning task, each participant has all the feature data and label data of the part of samples, so the federated learning task may be executed in parallel among these participants. Inside the participant, the data may be divided into the plurality of data blocks by sample (i.e., by row), each work node is instructed to process the corresponding data block, and then the parameter node is instructed to aggregate the processing results (for example, gradient or updated model parameters), so as to improve the efficiency of training the model of the federated learning algorithm. The specific steps for the parameter node and the work node to execute the horizontal federated learning task will be introduced below.

In some embodiments, the first part of samples and the second part of samples are both part of samples in the data and may not overlap. Therefore, both the first work node and the second work node may utilize the allocated computing resources to process the corresponding data block, so as to obtain a gradient parameter or directly obtain a trained model. In turn, the gradient parameter or the trained model may be sent to corresponding parameter node for gathering and aggregation, as will be described below.

According to some embodiments, the computing resources may include memory resources. Step S406, allocating the computing resources to the first work node and the second work node may include: a size of memory resources allocated to the first work node and a size of memory resources allocated to the second work node are determined based on the sizes of the data blocks respectively corresponding to the first work node and the second work node and a memory expansion rate of the federated learning algorithm used by the federated learning task. The memory expansion rate indicates a ratio of a size of a memory occupied by a federated learning model trained by the federated learning algorithm to a size of original data of the federated learning model when the federated learning task is executed. In this way, it can be ensured that each work node can work normally and efficiently, and full utilization of the memory resources is realized. It may be understood that other computing resources may further be allocated to the work nodes according to characteristics of the algorithm, the size of the data blocks and other information, which will not be repeated here.

Figure 5:
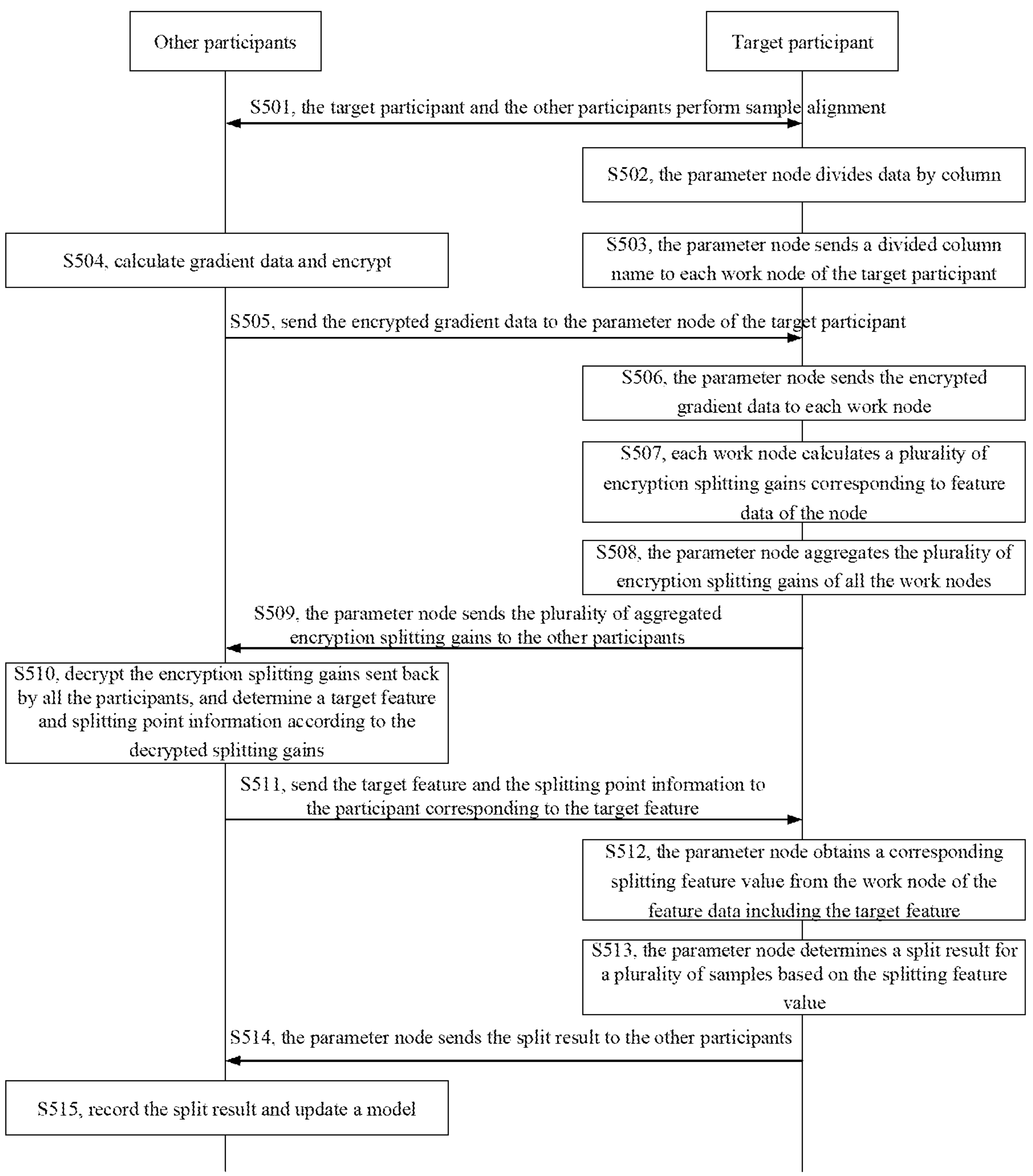
FIG. 5 shows a flow diagram of a vertical federated learning task according to an example embodiment of the present disclosure.

In some embodiments, the target participant includes the feature data, and other participants only include label data. As shown in FIG. 5, when the federated learning task is the vertical federated learning task, the complete process of executing the federated learning task may include: step S501, the target participant and the other participants perform sample alignment; step S502, the parameter node of the target participant divides the data by column; step S503, the parameter node of the target participant sends a divided column name to each work node of the target participant, and each node reads the data according to the column name; step S504, the other participants calculate gradient data and encrypt; step S505, the other participants send the encrypted gradient data to the parameter node of the target participant; step S506, the parameter node of the target participant sends the encrypted gradient data to each work node; step S507, each work node of the target participant calculates the plurality of encryption splitting gains corresponding to the feature data of the node; step S508, the parameter node of the target participant aggregates the plurality of encryption splitting gains of all the work nodes; step S509, the parameter node of the target participant sends the plurality of aggregated encryption splitting gains to the other participants; step S510, the other participants decrypt the encryption splitting gains sent back by all the participants including the feature data, and determine a target feature and splitting point information according to the decrypted splitting gains, and the splitting point information may include a splitting threshold; step S511, the other participants send the target feature and the splitting point information to the participant of the feature data including the target feature (for the convenience of explanation, it is assumed that the target participant is the participant of the feature data including the target feature); step S512, the parameter node of the target participant obtains a corresponding splitting feature value from the work node of the feature data including the target feature; step S513, the parameter node of the target participant determines a split result for the plurality of samples based on the splitting feature value; step S514, the parameter node of the target participant sends the split result to the other participants; and step S515, the other participants record the split result and update the model. The above steps S504 to S514 may be repeatedly executed until a predetermined termination condition is reached. By using the above mode, the plurality of work nodes may be utilized to process the vertical federated learning task executed on the target participant in parallel, thereby improving the efficiency of vertical federated learning.

In some embodiments, the federated learning algorithm used by the executed federated learning task executed in FIG. 5 may be an XGBoost algorithm. The other participants including the label data may calculate first-order gradient data (Gradient) and second-order gradient data (Hessian), and send the first-order gradient data and second-order gradient data encrypted using a homomorphic encryption algorithm to the target participant. For each feature in the data block, the work node of the target participant sorts the feature data of the features in all samples to obtain a plurality of candidate splitting points. The work node may calculate an encryption splitting gain of each candidate splitting point based on the encryption gradient data, and the parameter node gathers these encryption splitting gains and then sends it to the other participants including the label data. The other participants decrypt all the encrypted splitting gains of all the candidate splitting points of all the features of all the participants, determine the target feature and splitting point information with the largest splitting gain from it, and send these information to the participant of the feature data including the target feature. The parameter node of the participant obtains a feature value corresponding to the splitting point information from the corresponding work node, determines the split result according to the feature value and the feature data of the feature of the plurality of samples, and then synchronizes the split result to other participants, so as to complete the current round of iterations. It may be understood that the above process may be applied to other federated learning algorithms for the vertical federated learning task, which is not limited here.

In some embodiments, when the federated learning task is the horizontal federated learning task, both the target participant and the other participants may include all the respective feature data and label data of part of the samples in the plurality of samples. At this time, the model of the federated learning algorithm may be updated completely in parallel between the work nodes, and these models are fused by using the parameter node. The target participant and the other participants may also update respective models of the federated learning algorithm in parallel, and send encrypted model parameter to each other, so as to update the model parameter of the present participant by utilizing the model parameter of the other participants.

According to some embodiments, when the federated learning task is the horizontal federated learning task, step S407, executing the federated learning task may further include: the first work node and the second work node are instructed to read the corresponding data block in a streaming mode. Thus, by means of streaming reading, the work node may read the data of the part of samples in batches in each round of iteration, so that the data whose data volume far exceeds the capacity of computing resources may be trained through multiple iterations.

According to some embodiments, as shown in FIG. 4, the federated learning method further includes: step S408, a second deployment scheme for continuing to execute the federated learning task is generated based on expanded computing resources in response to receiving an instruction to expand the computing resources when the federated learning task is executed, wherein the second deployment scheme instructs to generate at least a third work node and a fourth work node on the first computing device; step S409, in response to determining to apply the second deployment scheme, the first work node and the second work node are stopped, and at least the third work node and the fourth work node are generated on the first computing device based on the second deployment scheme; and step S410, the third work node and the fourth work node are instructed to continue to execute the federated learning task.

In some embodiments, in the process of executing the federated learning task, as the data volume increases, there may be a problem that the computing resources of a participant server are insufficient, and the plurality of parallel computing tasks cannot be started or efficiently run. Through flexible expansion of the computing resources and generation of the second deployment scheme based on the expanded computing resources, after it is determined that the second deployment scheme is applied, new work nodes corresponding to the expanded computing resources are generated, and these new work nodes are instructed to continue to execute the federated learning task, thereby ensuring that the federated learning task can be completed efficiently.

In some embodiments, the computing resources may also be expanded by expanding more computing devices, then data can be re-allocated to each computing device according to the expanded computing devices, and the data are processed in parallel on these computing devices by utilizing the method of the present disclosure.

Figure 6:
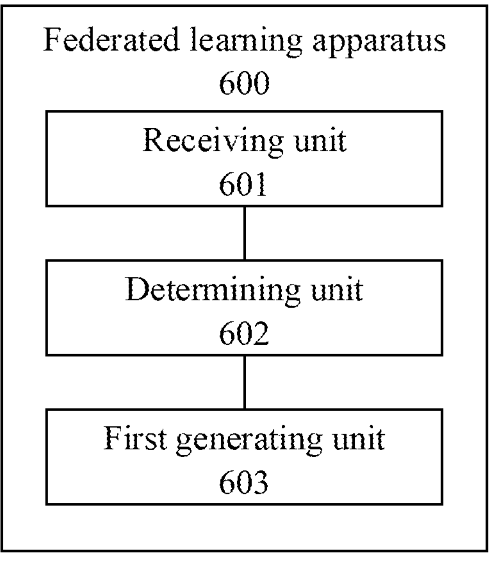
FIG. 6 shows a structural block diagram of a federated learning apparatus according to an example embodiment of the present disclosure.

According to another aspect of the present disclosure, a federated learning apparatus is provided. As shown in FIG. 6, a federated learning apparatus 600 includes: a receiving unit 601, configured to receive data related to a federated learning task of a target participant, wherein the target participant at least includes a first computing device for executing the federated learning task; a determining unit 602, configured to determine computing resources of the first computing device that are able to be used to execute the federated learning task; and a first generating unit 603, configured to generate a first deployment scheme for executing the federated learning task in response to determining that the data and the computing resources meet a predetermined condition, wherein the first deployment scheme instructs to generate at least a first work node and a second work node on the first computing device.

It may be understood that operations and effects of the unit 601 to the unit 603 in the federated learning apparatus 600 are similar to operations and effects of step S201 to step S203 in FIG. 2, which is not repeated here.

According to some embodiments, the predetermined condition may indicate that a size of a maximum computing resource allocated by the first computing device for a single work node in the computing resources is smaller than a size of the data.

According to some embodiments, the first work node and the second work node may be two processes running on the first computing device.

Figure 7:
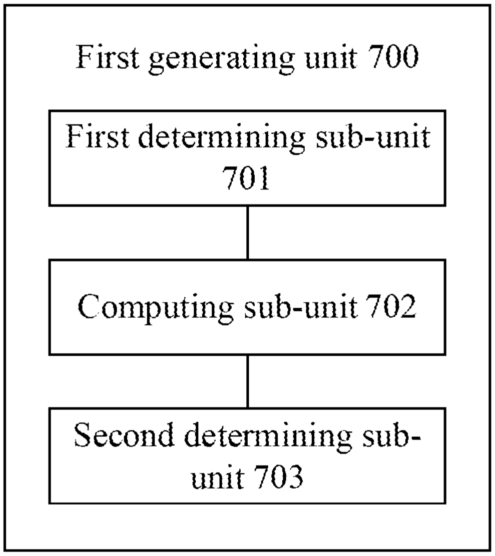
FIG. 7 shows a structural block diagram of a first generating unit according to an example embodiment of the present disclosure.

According to some embodiments, as shown in FIG. 7, the first generating first 700 may include: a first determining sub-unit 701, configured to determine a plurality of candidate node quantities, wherein each candidate node quantity of the plurality of candidate node quantities instructs to generate work nodes with the candidate node quantity on the first computing device; a computing sub-unit 702, configured to calculate, for each candidate node quantity of the plurality of candidate node quantities, an estimated processing time for the work nodes with the candidate node quantity to collaboratively execute the federated learning task, wherein each work node of the work nodes with the candidate node quantity is able to execute the federated learning task by using a part of the computing resources based on a part of the data; and a second determining sub-unit 703, configured to determine each candidate node quantity of the plurality of candidate node quantities and the estimated processing time corresponding to the candidate node quantity as the first deployment scheme.

Figure 8:
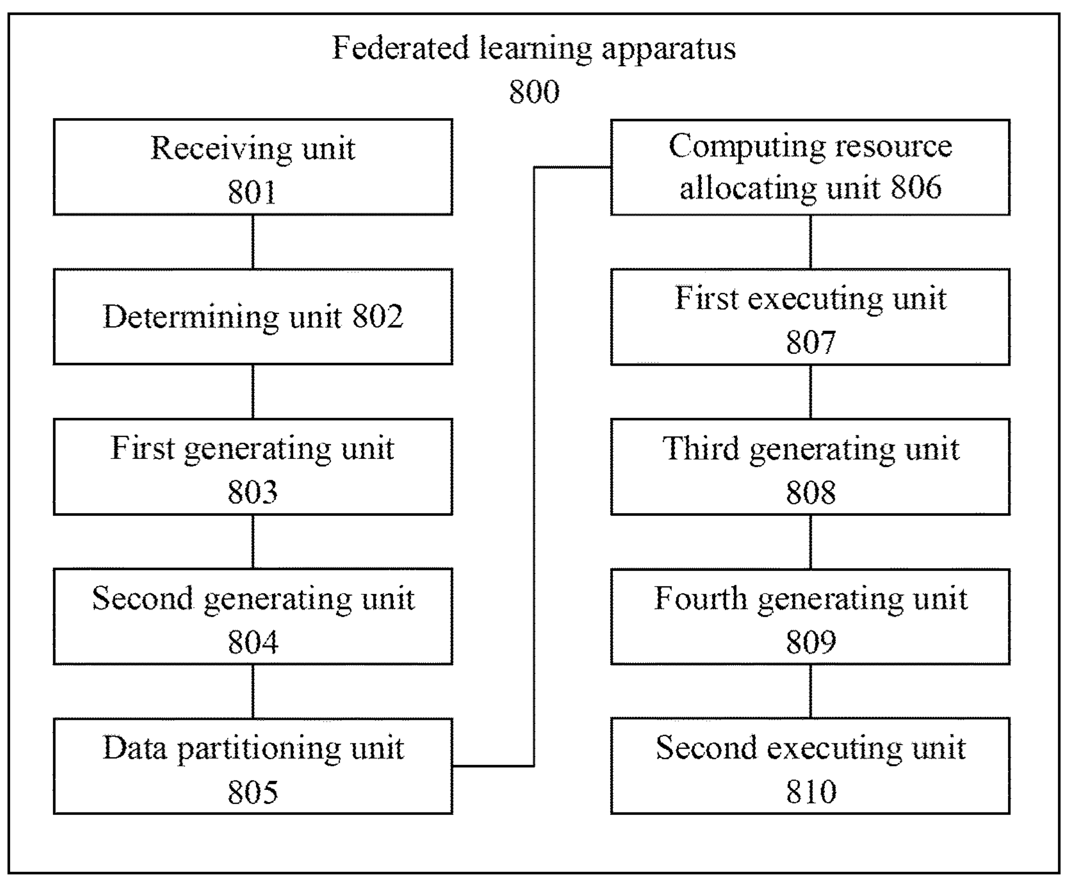
FIG. 8 shows a structural block diagram of a federated learning apparatus according to an example embodiment of the present disclosure.

According to some embodiments, as shown in FIG. 8, the federated learning apparatus 800 may further include: a second generating unit 804, configured to generate at least the first work node and the second work node on the first computing device based on the first deployment scheme in response to determining to apply the first deployment scheme; a data partitioning unit 805, configured to partition the data to obtain a data block corresponding to the first work node and a data block corresponding to the second work node; a computing resource allocating unit 806, configured to allocate the computing resources to the first work node and the second work node based on sizes of the data blocks respectively corresponding to the first work node and the second work node; and a first executing unit 807, configured to instruct the first work node and the second work node to execute the federated learning task in parallel. Operations and effects of the unit 801 to the unit 803 in the federated learning apparatus 800 are similar to operations and effects of the units 601 to 603 in the federated learning apparatus 600, which is not repeated here.

According to some embodiments, the data may include a plurality of respective feature data of a plurality of samples. When the federated learning task is a vertical federated learning task, the data partitioning unit is further configured to: partition the data based on a plurality of features included in the data, so as to obtain a first data block corresponding to the first work node and a second data block corresponding to the second work node, wherein the first data block may include a first part of feature data of the plurality of samples, and the second data block includes a second part of feature data of the plurality of samples.

According to some embodiments, when the federated learning task is a horizontal federated learning task, the data partitioning unit is further configured to: partition the data based on the plurality of samples included in the data, so as to obtain a third data block corresponding to the first work node and a fourth data block corresponding to the second work node, wherein the third data block may include a plurality of feature data of a first part of samples of the plurality of samples, and the fourth data block includes a plurality of feature data of a second part of samples of the plurality of samples.

According to some embodiments, the computing resources may include memory resources. The computing resource allocating unit is further configured to: determine a size of memory resources allocated to the first work node and a size of memory resources allocated to the second work node based on the sizes of the data blocks respectively corresponding to the first work node and the second work node and a memory expansion rate of a federated learning algorithm used by the federated learning task, wherein the memory expansion rate indicates a ratio of a size of a memory occupied by a federated learning model trained by the federated learning algorithm to a size of original data of the federated learning model when the federated learning task is executed.

According to some embodiments, the federated learning task may be the vertical federated learning task. The first deployment scheme may further instruct to generate a parameter node on the first computing device. The first executing unit is further configured to: instruct the parameter node to receive a first parameter from other participants including respective label data of the plurality of samples, and send the first parameter to the first work node and the second work node, wherein the first parameter is encryption gradient data corresponding to the plurality of samples; instruct the first work node and the second work node to utilize the corresponding computing resources respectively, calculate a second parameter based on the first parameter and the corresponding data block, and send the second parameter to the parameter node, wherein the second parameter is an encryption splitting gain determined based on a sorting result of the part of respective feature data of the plurality of samples included in the corresponding data block and the encryption gradient data; instruct the parameter node to aggregate the second parameters received from the first work node and the second work node respectively, and send an aggregated second parameter to the other participants; instruct the parameter node to receive splitting point information of a target feature from the other participants, and send the splitting point information to a work node corresponding to the target feature; instruct the work node to determine a splitting feature value based on the splitting point information and the data block corresponding to the work node, and send the splitting feature value to the parameter node; instruct the parameter node to determine a split result for the plurality of samples based on the splitting feature value; and instruct the parameter node to send the split result to the other participants.

According to some embodiments, the federated learning task may be the horizontal federated learning task. The first executing unit may further configured to: instruct the first work node and the second work node to read the corresponding data block in a streaming mode.

According to some embodiments, as shown in FIG. 8, the federated learning apparatus 800 may further include: a third generating unit 808, configured to generate a second deployment scheme for continuing to execute the federated learning task based on expanded computing resources in response to receiving an instruction to expand the computing resources when the federated learning task is executed, wherein the second deployment scheme instructs to generate at least a third work node and a fourth work node on the first computing device; a fourth generating unit 809, configured to stop, in response to determining to apply the second deployment scheme, the first work node and the second work node and generate at least the third work node and the fourth work node on a second computing device based on the second deployment scheme; and a second executing unit 810, configured to instruct the third work node and the fourth work node to continue to execute the federated learning task.

In the technical solution of the present disclosure, related processing such as collecting, storing, using, processing, transmitting, providing and disclosing of user personal information all conforms to provisions of relevant laws and regulations, and does not violate public order and moral.

According to embodiments of the present disclosure, an electronic device, a readable storage medium and a computer program product are further provided.

Figure 9:
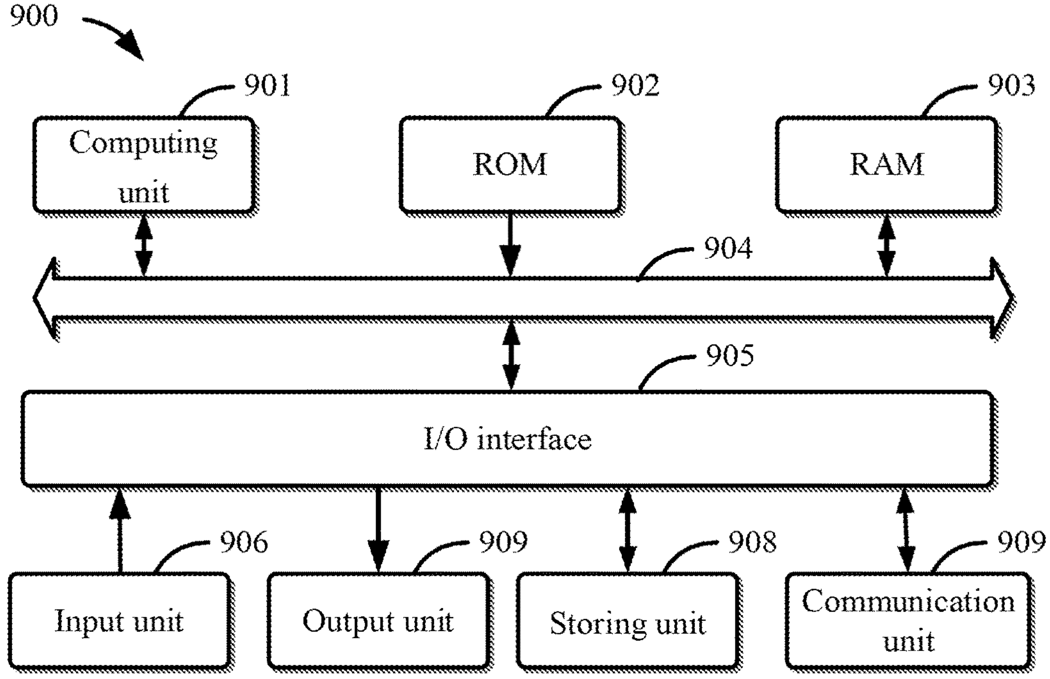
FIG. 9 shows a structural block diagram of an example electronic device capable of being used to implement an embodiment of the present disclosure.

Referring to FIG. 9, a structural block diagram of an electronic device 900 which can serve as a server or a client of the present disclosure will now be described, which is an example of a hardware device capable of being applied to all aspects of the present disclosure. The electronic device aims to express various forms of digital-electronic computer devices, such as a laptop computer, a desk computer, a work bench, a personal digital assistant, a server, a blade server, a mainframe computer and other proper computers. The electronic device may further express various forms of mobile apparatuses, such as a personal digital assistant, a cellular phone, an intelligent phone, a wearable device and other similar computing apparatuses. Parts shown herein, their connection and relations, and their functions only serve as an example, and are not intended to limit implementation of the present disclosure described and/or required herein.

As shown in FIG. 9, the device 900 includes a computing unit 901, which may execute various proper motions and processing according to a computer program stored in a read-only memory (ROM) 902 or a computer program loaded from a storing unit 908 to a random access memory (RAM) 903. In the RAM 903, various programs and data required by operation of the device 900 may further be stored. The computing unit 901, the ROM 902 and the RAM 903 are connected with one another through a bus 904. An input/output (I/O) interface 905 is also connected to the bus 904.

A plurality of parts in the device 900 are connected to the I/O interface 905, and including: an input unit 906, an output unit 909, the storing unit 908 and a communication unit 909. The input unit 906 may be any type of device capable of inputting information to the device 900, the input unit 906 may receive input digital or character information, and generates key signal input relevant to user setting and/or functional control of the electronic device, and may include but not limited to a mouse, a keyboard, a touch screen, a trackpad, a trackball, an operating lever, a microphone and/or a remote control. The output unit 909 may be any type of device capable of presenting information, and may include but not limited to a display, a loudspeaker, a video/audio output terminal, a vibrator and/or a printer. The storing unit 908 may include but not limited to a magnetic disc and an optical disc. The communication unit 909 allows the device 900 to exchange information/data with other devices through a computer network such as Internet and/or various telecommunication networks, and may include but not limited to a modem, a network card, an infrared communication device, a wireless communication transceiver and/or a chip set, such as a Bluetooth™ device, an 802.11 device, a WiFi device, a WiMax device, a cellular communication device and/or analogues.

The computing unit 901 may be various general and/or dedicated processing components with processing and computing capabilities. Some examples of the computing unit 901 include but not limited to a central processing unit (CPU), a graphic processing unit (GPU), various dedicated artificial intelligence (AI) computing chips, various computing units running a machine learning model algorithm, a digital signal processor (DSP), and any proper processor, controller, microcontroller, etc. The computing unit 901 executes all methods and processing described above, such as the federated learning method. For example, in some embodiments, the federated learning method may be implemented as a computer software program, which is tangibly contained in a machine readable medium, such as the storing unit 908. In some embodiments, part of all of the computer program may be loaded into and/or mounted on the device 900 via the ROM 902 and/or the communication unit 909. When the computer program is loaded to the RAM 903 and executed by the computing unit 901, one or more steps of the federated learning method described above may be executed. Alternatively, in other embodiments, the computing unit 901 may be configured to execute the federated learning method through any other proper modes (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through the communication network. A relationship of the client and the server is generated through computer programs run on a corresponding computer and mutually having a client-server relationship. The server may be a cloud server, also referred to as a cloud computing server or a cloud host, and is a host product in a cloud computing service system to solve defects of difficult management and weak business expansion in a traditional physical host and virtual private server ("VPS" for short) service.

The server may also be a server of a distributed system, or a server in combination with a blockchain.

It should be understood that various forms of flows shown above may be used to reorder, increase or delete the steps. For example, all the steps recorded in the present disclosure may be executed in parallel, and may also be executed sequentially or in different sequences, as long as the expected result of the technical solution disclosed by the present disclosure may be implemented, which is not limited herein.

Although the embodiments or examples of the present disclosure have been described with reference to the accompanying drawings, it should be understood that the above method, system and device is only an example embodiment or an example, and the scope of the present disclosure is not limited by these embodiments or examples, but only limited by the authorized claim and equivalent scope thereof. Various elements in the embodiments or the examples may be omitted or may be replaced with their equivalent elements. In addition, all the steps may be executed through the sequence different from that described in the present disclosure. Further, various elements in the embodiments or the examples may be combined in various modes. It is important that with evolution of the technology, many elements described here may be replaced with the equivalent element appearing after the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A federated learning method, comprising:

receiving data related to a federated learning task of a target participant, wherein the target participant at least comprises a first computing device for executing the federated learning task;

determining computing resources of the first computing device that are available to be used to execute the federated learning task; and generating a first deployment scheme for executing the federated learning task in response to determining that the data and the computing resources meet a threshold, wherein the first deployment scheme causes to generate at least a first work node and a second work node on the first computing device;

generating at least the first work node and the second work node on the first computing device based on the first deployment scheme in response to determining to apply the first deployment scheme, partitioning the data to obtain a data block corresponding to the first work node and a data block corresponding to the second work node;

allocating the computing resources to the first work node and the second work node based on a size of the data block corresponding to the first work node and a size of the data block corresponding to the second work node; and causing the first work node and the second work node to execute the federated learning task in parallel, wherein the computing resources comprise memory resources, and wherein the allocating the computing resources to the first work node and the second work node comprises:

determining a size of memory resources allocated for the first work node and a size of memory resources allocated for the second work node based on a size of the data block corresponding to the first work node, a size of the data block corresponding to the second work node and a memory expansion rate of a federated learning algorithm used by the federated learning task, wherein the memory expansion rate indicates a ratio of a size of a memory occupied by a federated learning model trained by the federated learning algorithm to a size of original data of the federated learning model when the federated learning task is executed.

2. The method according to claim 1, wherein the generating the first deployment scheme comprises:

determining a plurality of candidate node quantities, wherein each candidate node quantity of the plurality of candidate node quantities indicates a quantity of work nodes to be generated on the first computing device;

calculating, for each candidate node quantity of the plurality of candidate node quantities, an estimated processing time for the quantity of work nodes to collaboratively execute the federated learning task, wherein each work node of the quantity of work nodes is able to execute the federated learning task by using a part of the computing resources based on a part of the data; and determining each candidate node quantity of the plurality of candidate node quantities and the estimated processing time corresponding to the candidate node quantity as the first deployment scheme.

3. The method according to claim 1, further comprising:

generating a second deployment scheme for continuing to execute the federated learning task based on expanded computing resources in response to receiving an instruction to expand the computing resources when the federated learning task is executed, wherein the second deployment scheme causes to generate at least a third work node and a fourth work node on the first computing device;

stopping, in response to determining to apply the second deployment scheme, the first work node and the second work node and generating at least the third work node and the fourth work node on the first computing device based on the second deployment scheme; and causing the third work node and the fourth work node to continue to execute the federated learning task.

4. The method according to claim 1, wherein the data comprise a plurality of respective feature data of a plurality of samples, and the federated learning task is a vertical federated learning task, wherein the partitioning the data comprises:

partitioning the data based on a plurality of features comprised in the data, so as to obtain a first data block corresponding to the first work node and a second data block corresponding to the second work node, wherein the first data block comprises a first part of feature data of the plurality of samples, and the second data block comprises a second part of feature data of the plurality of samples.

5. The method according to claim 4, wherein the federated learning task is the vertical federated learning task, wherein the first deployment scheme further causes to generate a parameter node on the first computing device, wherein the executing the federated learning task comprises:

causing the parameter node to receive a first parameter from other participants comprising respective label data of the plurality of samples, and send the first parameter to the first work node and the second work node, wherein the first parameter is encryption gradient data corresponding to the plurality of samples;

causing the first work node to calculate a second parameter corresponding to the first work node based on the first parameter and the first data block by using the computing resources allocated for the first work node, and send the second parameter corresponding to the first work node to the parameter node, wherein the second parameter corresponding to the first work node is an encryption splitting gain determined based on a sorting result of the first part of feature data of the plurality of samples comprised in the first data block and the encryption gradient data;

causing the second work node to calculate a second parameter corresponding to the second work node based on the first parameter and the second data block by using the computing resources allocated for the second work node, and send the second parameter corresponding to the second work node to the parameter node, wherein the second parameter corresponding to the second work node is an encryption splitting gain determined based on a sorting result of the second part of feature data of the plurality of samples comprised in the second data block and the encryption gradient data;

causing the parameter node to aggregate the second parameter corresponding to the first work node and the second parameter corresponding to the second work node, and send an aggregated second parameter to the other participants;

causing the parameter node to receive splitting point information of a target feature from the other participants, and send the splitting point information to a work node corresponding to the target feature;

causing the work node corresponding to the target feature to determine a splitting feature value based on the splitting point information and the data block corresponding to the work node corresponding to the target feature, and send the splitting feature value to the parameter node;

causing the parameter node to determine a split result for the plurality of samples based on the splitting feature value; and causing the parameter node to send the split result to the other participants.

6. The method according to claim 1, wherein the data comprise a plurality of respective feature data of a plurality of samples, and the federated learning task is a horizontal federated learning task, wherein the partitioning the data comprises:

partitioning the data based on the plurality of samples comprised in the data, so as to obtain a third data block corresponding to the first work node and a fourth data block corresponding to the second work node, wherein the third data block comprises a plurality of feature data of a first part of samples of the plurality of samples, and the fourth data block comprises a plurality of feature data of a second part of samples of the plurality of samples.

7. The method according to claim 6, wherein the executing the federated learning task further comprises:

causing the first work node and the second work node to read the corresponding data block in a streaming mode.

8. The method according to claim 1, wherein the threshold includes that a size of a maximum computing resource allocated by the first computing device for a single work node in the computing resources is smaller than a size of the data.

9. The method according to claim 1, wherein the first work node and the second work node are two processes running on the first computing device.

10. An electronic device, comprising:

one or more processors;

a memory storing one or more programs configured to be executed by the one or more processors, the one or more programs including instructions for:

receiving data related to a federated learning task of a target participant, wherein the target participant at least comprises a first computing device for executing the federated learning task;

determining computing resources of the first computing device that are available to be used to execute the federated learning task; and generating a first deployment scheme for executing the federated learning task in response to determining that the data and the computing resources meet a threshold, wherein the first deployment scheme indicates to generate at least a first work node and a second work node on the first computing device;

generating at least the first work node and the second work mode on the first computing device based on the first deployment scheme in response to determining to apply the first deployment scheme, partitioning the data to obtain a data block corresponding to the first work node and a data block corresponding to the second work node;

allocating the computing resources to the first work node and the second work node based on a size of the data block corresponding to the first work node and a size of the data block corresponding to the second work node; and causing the first work node and the second work node to execute the federated learning task in parallel, wherein the computing resources comprise memory resources, and wherein the allocating the computing resources to the first work mode and the second work node comprises:

determining a size of memory resources allocated for the first work node and a size of memory resources allocated for the second work node based on a size of the data block corresponding to the first work node, a size of the data block corresponding to the second work node and a memory expansion rate of a federated learning algorithm used by the federated learning task, wherein the memory expansion rate indicates a ratio of a size of a memory occupied by a federated learning model trained by the federated learning algorithm to a size of original data of the federated learning model when the federated learning task is executed.

11. The electronic device according to claim 10, wherein the generating the first deployment scheme comprises:

determining a plurality of candidate node quantities, wherein each candidate node quantity of the plurality of candidate node quantities indicates a quantity of work nodes to be generated on the first computing device;

calculating, for each candidate node quantity of the plurality of candidate node quantities, an estimated processing time for the quantity of work nodes to collaboratively execute the federated learning task, wherein each work node of the quantity of work nodes is able to execute the federated learning task by using a part of the computing resources based on a part of the data; and determining each candidate node quantity of the plurality of candidate node quantities and the estimated processing time corresponding to the candidate node quantity as the first deployment scheme.

12. The electronic device according to claim 10, wherein the one or more programs further including instructions for:

generating a second deployment scheme for continuing to execute the federated learning task based on expanded computing resources in response to receiving an instruction to expand the computing resources when the federated learning task is executed, wherein the second deployment scheme causes to generate at least a third work node and a fourth work node on the first computing device;

stopping, in response to determining to apply the second deployment scheme, the first work node and the second work node and generating at least the third work node and the fourth work node on the first computing device based on the second deployment scheme; and causing the third work node and the fourth work node to continue to execute the federated learning task.

13. The electronic device according to claim 10, wherein the data comprise a plurality of respective feature data of a plurality of samples, and the federated learning task is a vertical federated learning task, wherein the partitioning the data comprises:

partitioning the data based on a plurality of features comprised in the data, so as to obtain a first data block corresponding to the first work node and a second data block corresponding to the second work node, wherein the first data block comprises a first part of feature data of the plurality of samples, and the second data block comprises a second part of feature data of the plurality of samples.

14. The electronic device according to claim 13, wherein the federated learning task is the vertical federated learning task, wherein the first deployment scheme further causes to generate a parameter node on the first computing device, wherein the executing the federated learning task comprises:

causing the parameter node to receive a first parameter from other participants comprising respective label data of the plurality of samples, and send the first parameter to the first work node and the second work node, wherein the first parameter is encryption gradient data corresponding to the plurality of samples;

causing the first work node to calculate a second parameter corresponding to the first work node based on the first parameter and the first data block by using the computing resources allocated for the first work node, and send the second parameter corresponding to the first work node to the parameter node, wherein the second parameter corresponding to the first work node is an encryption splitting gain determined based on a sorting result of the first part of feature data of the plurality of samples comprised in the first data block and the encryption gradient data;

causing the second work node to calculate a second parameter corresponding to the second work node based on the first parameter and the second data block by using the computing resources allocated for the second work node, and send the second parameter corresponding to the second work node to the parameter node, wherein the second parameter corresponding to the second work node is an encryption splitting gain determined based on a sorting result of the second part of feature data of the plurality of samples comprised in the second data block and the encryption gradient data;

causing the parameter node to aggregate the second parameter corresponding to the first work node and the second parameter corresponding to the second work node, and send an aggregated second parameter to the other participants;

causing the parameter node to receive splitting point information of a target feature from the other participants, and send the splitting point information to a work node corresponding to the target feature;

causing the work node corresponding to the target feature to determine a splitting feature value based on the splitting point information and the data block corresponding to the work node corresponding to the target feature, and send the splitting feature value to the parameter node;

causing the parameter node to determine a split result for the plurality of samples based on the splitting feature value; and causing the parameter node to send the split result to the other participants.

15. The electronic device according to claim 10, wherein the data comprise a plurality of respective feature data of a plurality of samples, and the federated learning task is a horizontal federated learning task, wherein the partitioning the data comprises:

partitioning the data based on the plurality of samples comprised in the data, so as to obtain a third data block corresponding to the first work node and a fourth data block corresponding to the second work node, wherein the third data block comprises a plurality of feature data of a first part of samples of the plurality of samples, and the fourth data block comprises a plurality of feature data of a second part of samples of the plurality of samples.

16. A non-transitory computer-readable storage medium storing one or more programs, the one or more programs comprising instructions, which when executed by one or more processors of an electronic device, cause the electronic device to:

receive data related to a federated learning task of a target participant, wherein the target participant at least comprises a first computing device for executing the federated learning task;

determine computing resources of the first computing device that are available to be used to execute the federated learning task; and generate a first deployment scheme for executing the federated learning task in response to determining that the data and the computing resources meet a threshold, wherein the first deployment scheme causes to generate at least a first work node and a second work node on the first computing device;

generate at least the first work node and the second work node on the first computing device based on the first deployment scheme in response to determining to apply the first deployment scheme;

partition the data to obtain a data block corresponding to the first work node and a data block corresponding to the second work node;

allocate the computing resources to the first work node and the second work node based on a size of the data block corresponding to the first work node and a size of the data block corresponding to the second work node; and cause the first work node and the second work node to execute the federated learning task in parallel, wherein the computing resources comprise memory resources, and wherein the allocating the computing resources to the first work node and the second work node comprises:

determining a size of memory resources allocated for the first work node and a size of memory resources allocated for the second work node based on a size of the data block corresponding to the first work node, a size of the data block corresponding to the second work node and a memory expansion rate of a federated learning algorithm used by the federated learning task, wherein the memory expansion rate indicates a ratio of a size of a memory occupied by a federated learning model trained by the federated learning algorithm to a size of original data of the federated learning model when the federated learning task is executed.

* * * * *